(No Model.)
P. J. GREGORY.
ADJUSTABLE STEP FOR VEHICLES.
No. 388,861. Patented Sept. 4, 1888.
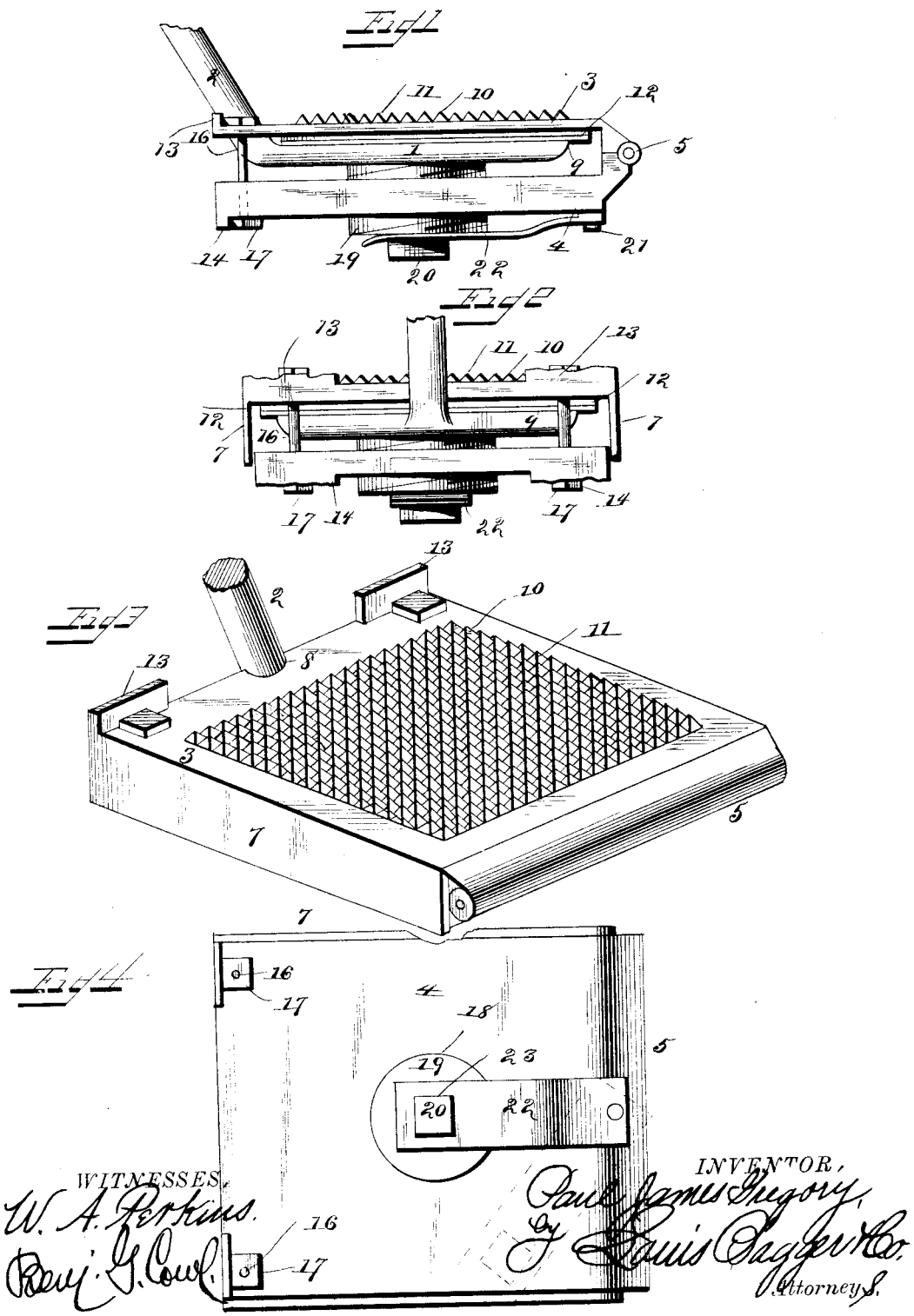

UNITED STATES PATENT OFFICE.

PAUL JAMES GREGORY, OF MARILLA, NEW YORK.

ADJUSTABLE STEP FOR VEHICLES.

SPECIFICATION forming part of Letters Patent No. 388,861, dated September 4, 1888.

Application filed December 24, 1887. Serial No. 258,884. (No model.)

*To all whom it may concern:*

Be it known that I, PAUL JAMES GREGORY, a citizen of the United States, and a resident of Marilla, in the county of Erie and State of New York, have invented certain new and useful Improvements in Adjustable Steps for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my new and improved adjustable step for carriages and other vehicles, showing the same arranged in its operative position and the side flange broken away. Fig. 2 is a rear elevation of the same, the side flanges being shown. Fig. 3 is a perspective top view, and Fig. 4 is a bottom plan view.

The same numerals of reference indicate corresponding parts in all the figures.

My invention consists in a new and improved safety step which is adapted to be secured in operative position over the fixed steps of all kinds of vehicles; and my invention will be hereinafter fully described and claimed.

Referring to the several parts by their designating-numerals, 1 indicates the ordinary metal step of a carriage or other vehicle, and 2 indicates the stem or support of the same.

3 indicates the top and 4 the bottom of the metal frame of my invention, this part of the step being preferably made of iron or steel. This top and bottom of the step, which are both made somewhat larger than the ordinary fixed step of a vehicle, for the reason which will be hereinafter set forth, are hinged together at 5 at their outer ends by a neat hinge. The bottom 4 of the step is formed solid, with the exception of the screw-apertures, which will be hereinafter referred to, while the top 3 is cast with the open top, leaving only the top flange, 6, and is also cast with the downwardly-depending side flanges, 7 7, the lower edges of which extend down below the level of the top of the bottom piece, 4, as clearly shown in Fig. 2 of the drawings. These side flanges serve to give a finish to the appearance of the adjustable step, and also to prevent the entrance of dirt, &c., within the step. The rear end of the step-top 3 is formed with the semicircular recess 8, in which the stem 2 of the step fits.

In placing the adjustable step in position a thin flat plate of metal, 9, is first placed upon the top of the fixed vehicle-step 1, this metal plate being larger than the area of the step. The corrugated rubber plate 10 is then placed in position in the top of the adjustable step. This rubber plate is formed on its upper side with teeth or corrugations 11, and its main part is of such size that it will just pass up snugly through the large opening in the top 3 of the adjustable step. The opening in the top of the step and the corrugated main part of the rubber plate are both larger in size than the surface of the fixed vehicle step 1, as shown in the accompanying drawings. The lower part of the rubber plate is formed all around its edges with the projecting flange 12, which thus projects out on every side beyond the sides of the main part of the rubber plate, the bottom of the rubber plate being thus larger than its top. The corrugated rubber plate is placed in position from the inside of the adjustable step, the corrugated main part of the block or plate passing up through the open top 3, while the projecting bottom edge flanges, 12, bear against the top flange, 6, of the top 3, against the under side thereof.

At its rear edge the top 3 is formed with the upwardly-projecting lugs 13 13, while the bottom 4 is formed at its rear edge with the downwardly-extending lugs 14 14 directly opposite to the lugs 13 13, as shown. The top and bottom are formed at their rear ends with the opposite apertures 15 15 directly in front of the lugs 13 and 14, through which pass the bolts 16. These bolts are formed with square heads, and on their lower threaded ends are screwed square nuts 17.

In the center of the bottom 4 is formed a large threaded aperture, 18, in which is screwed a large short binding-screw, 19. This binding-screw, the diameter of which is rather greater than its length, is formed with a perfectly-flat top or upper end, while at its lower end it is formed with a square projection, 20, so that a wrench can be readily fitted to the binding-screw for the purpose of adjusting it, screwing it in or out.

To the forward end of the lower side of the bottom 4 is secured by a pivot, 21, a spring, 22, which is formed near its free end with a square hole, 23, of such size that the square projection 20 on the lower end of the binding-screw will fit snugly through the said hole. The free extremity of the spring is thickened and curved slightly outward to form a convenient thumb-piece in moving the spring. To operate the binding-screw, the free end of the spring 22 is pushed down by the finger, so as to clear the apertured end of the spring from the square projection of the binding-screw when the spring is turned to one side, as shown in dotted lines in Fig. 4 of the drawings.

In placing the adjustable step in position the corrugated rubber plate is first placed in position from the interior of the adjustable step, so that its corrugated main portion projects up through the open top 3, as shown. The thin flat metal plate 9 is then placed on the fixed vehicle-step, and the hinged adjustable step is placed over the fixed step and the metal plate, the stem 2 fitting up through the recess 8, when the bolts 16 16 are passed through the apertures 15 15 in the rear part of the top and bottom, and the square nuts 17 17 are then screwed upon the threaded lower ends of the bolts 16 16. The square heads of these bolts are drawn down against the upper side of the top 3, when it will be seen that the upwardly-projecting lugs 13 13 will prevent the square heads of the bolts from turning, and thus keep the bolts themselves stationary. The square nuts 17 are screwed up as far as the downward projections 14 14 will permit. The spring 22 having been moved to one side, the large binding-screw 19 is then screwed up by a wrench, when its upper flat end, bearing against the fixed step 1, will draw the top 3 of the adjustable step down tightly, and at the same time draw down the bottom of the hinged adjustable step; and it will be seen that as the adjustable step is thus tightened the square nuts 17 17 will be drawn up by the bolts 16 above the lower ends of the projections 14 14, when the said projections will prevent the said nuts from turning on the bolts, and the said bolts will be thus securely locked in their operative positions. As the adjustable step is thus tightened by the binding-screw 19, the thin flat metal plate 9 will be pressed up tightly against the bottom of the rubber plate, and will thus bind the projecting bottom edge flange of the rubber plate tightly between its outer edge portion and the top flange, 6, of the open top 3. The object of using this thin metal plate is, that the ordinary vehicle-step, even when not worn by use, is no larger than is required for safety, and the corrugated rubber plate should be at least as large as the fixed step. I therefore make the adjustable step larger than the fixed step and the opening in the top 3 and the main corrugated part of the rubber plate somewhat larger than the fixed step; and it will be seen that by employing the thin metal plate 9 above the fixed step the said plate will be pressed up by the step, and is of sufficient size to extend under the bottom edge flange of the rubber plate and bind the same tightly between it and the top 3. When the binding-screw is turned up so as to bind the adjustable step firmly on the fixed step, the spring 22 is turned back, so that the square projection on the lower end of the binding-screw will pass through the square opening in the free end of the said spring, and the spring will thus lock the binding-screw in its adjusted position and prevent its turning or working loose.

It will be seen that my new and improved adjustable step, which is adapted for all kinds of vehicles, is simple and strong in construction and can be manufactured at a small cost, and that it is exceedingly useful and effective in use. It can be adjusted in a few moments, and will form a perfect safety-step, as there is no danger of slipping on it. The only part of the step which can wear out is the corrugated rubber plate, which can be removed and replaced in a few moments and at a trifling cost.

Instead of forming the top of the adjustable step open, as shown in the drawings, and passing the rubber plate up through it, I can, if preferred, cast the top solid, with a deep recess in it of the same size as the opening in the top here shown, and in this recess fit or seat a flat rubber plate having a corrugated upper surface, as will be readily understood.

Having thus described my invention, what I claim, and desire to secure by Letters Patent of the United States, is—

1. An adjustable safety-step for vehicles, consisting of a top and bottom piece hinged together at their outer ends, the top being formed with a large main opening and apertures near its rear edge, and the bottom having a large central threaded opening and the rear apertures, the retaining-bolts, the rubber plate having the corrugated upper surface and the bottom edge flange, and the binding-screw.

2. The combination of the hinged top and bottom parts, the retaining-bolts, the corrugated rubber plate, the thin metal plate, and the binding-screw, substantially as set forth.

3. The combination of the hinged top and bottom parts, the retaining-bolts having the square heads and square nuts, the corrugated rubber plate, the thin metal plate, the binding screw, and the locking-spring for the said screw, all substantially as set forth.

In testimony that I claim the foregoing as my own I have hereunto affixed my signature in presence of two witnesses.

PAUL JAMES GREGORY.

Witnesses:
 H. T. FOSTER,
 H. LA VERNE CARY.